Dec. 17, 1963 C. Y. FERRIS, JR Re. 25,496
GRANITE BOWLING ALLEY
Original Filed Oct. 16, 1958 4 Sheets-Sheet 1
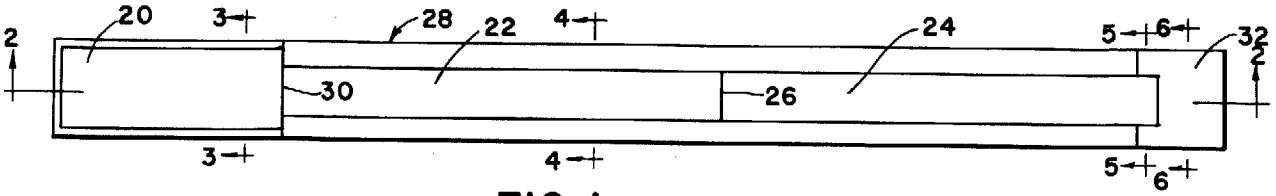
FIG. 1.
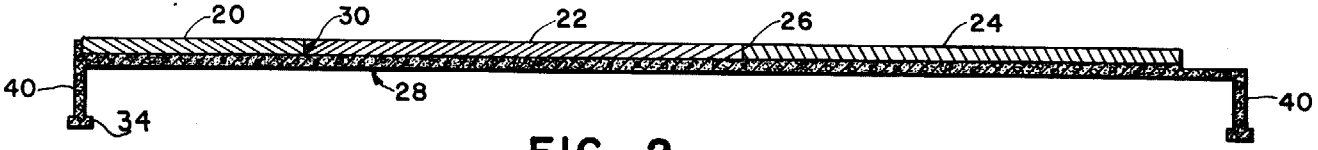
FIG. 2.
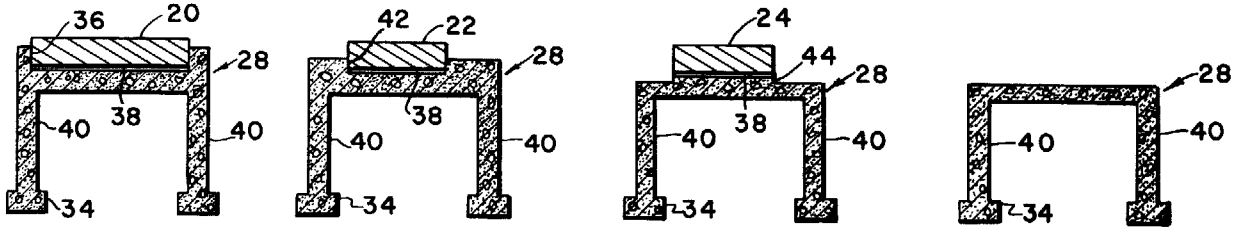
FIG. 3.
FIG. 4.
FIG. 5.
FIG. 6.
INVENTOR.
Cyrus Y. Ferris, Jr.
BY
Diggins & LeBlanc
Attorneys.

GRANITE BOWLING ALLEY

Original Filed Oct. 16, 1958 4 Sheets-Sheet 2

INVENTOR.
Cyrus Y. Ferris, Jr.
BY
Diggins & LeBlanc
Attorneys

GRANITE BOWLING ALLEY

Original Filed Oct. 16, 1958 4 Sheets-Sheet 3

INVENTOR.
Cyrus Y. Ferris, Jr.
BY
Diggins & LeBlanc
Attorneys.

GRANITE BOWLING ALLEY

Original Filed Oct. 16, 1958 4 Sheets-Sheet 4

INVENTOR.
Cyrus Y. Ferris, Jr.
BY
Diggins & Le Blanc
Attorneys.

United States Patent Office

Re. 25,496
Reissued Dec. 17, 1963

25,496
GRANITE BOWLING ALLEY

Cyrus Y. Ferris, Jr., Montpelier, Vt., assignor to Rock of Ages Corporation, Barre, Vt., a corporation of Vermont Original No. 2,992,001, dated July 11, 1961, Ser. No. 767,621, Oct. 16, 1958. Application for reissue May 4, 1962, Ser. No. 193,352
9 Claims. (Cl. 273—51)

Matter enclosed in heavy brackets [ ] appears in the original patent but forms no part of this reissue specification; matter printed in italics indicates the additions made by reissue.

This invention relates to a construction for an outdoor bowling alley and in particular relates to an outdoor bowling alley made of granite.

Outdoor bowling alleys have been constructed in the past of either wood or concrete. The outdoor bowling alleys surfaced in wood have been plagued with warping and buckling by virtue of the exposure of the wood to the elements and this has resulted in a surface that was entirely too rough and hence unsatisfactory for any degree of enjoyable competition. Also, no satisfactory manner of compensating for the expansion and contraction at each of the joints along the surface of the alley has been devised.

The outdoor bowling alleys surfaced with concrete, on the other hand, have proven to be unsatisfactory primarily because of the relatively high temperature coefficient of linear expansion of the concrete which produces cracks in the surface with fluctuations in temperature. Exposure to wind and rain also makes it very difficult to obtain and maintain a smooth surface on such an outdoor bowling alley. Also, the cement surface tends to have an abrasive effect on the plastic balls which are used.

It has been discovered according to the present invention that by making the bowling surface from two slabs of granite in a construction providing for expansion only at the ends of the granite slabs these problems may be obviated. Furthermore, this invention includes a novel buffer to be used in connecton with the permanent installation on the granite bowling alley. It has been found that if the surface is not buffed it will have an abrasive effect on the plastic balls which are used. Moreover, it has been discovered that this buffing must be performed at the site of the permanent installations because the heat generated in the buffing operation causes some slight vitrification of the granite slabs which in the course of shipping results in small surface cracks which will not withstand the pounding and rolling of the bowling ball. Means are also provided to establish and maintain the granite slabs level so that the alleys shall not be adversely affected by ground settling, buckling produced by frost or other factors causing elevation changes in the ground.

Accordingly, it is a primary object of the present invention to provide an outdoor bowling alley that will not be adversely affected by changes in temperature, wind, rain, and the elements.

It is another object of the present invention to provide an outdoor bowling alley that may be maintained in a smooth and level condition.

It is a further object of the present invention to provide a novel means for maintaining the bowling alleys smooth.

It is an additional object of the invention to provide means for compensating for ground settling or swelling.

These and further objects and advantages of the invention will become more apparent upon reference to the following specification and claims and appended drawings wherein:

FIGURE 1 discloses a plan view of the outdoor bowling alley of the present invention;

FIGURE 2 shows a cross-sectional view taken along the line 2—2 of FIGURE 1;

FIGURE 3 shows a cross-sectional view taken along the lines 3—3 of FIGURE 1;

FIGURE 4 shows a cross-sectional view taken along the lines 4—4 of FIGURE 1;

FIGURE 5 shows a cross-sectional view taken along the lines 5—5 of FIGURE 1;

FIGURE 6 shows a cross-sectional view taken along the lines 6—6 of FIGURE 1;

Figure 9:
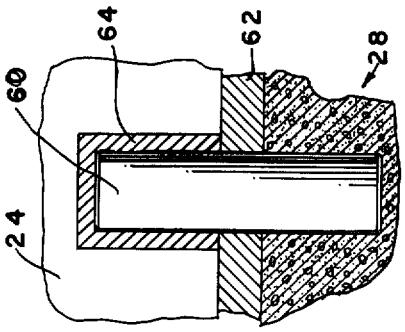
FIGURE 9 is a cross-sectional view taken along the lines 9—9 of FIGURE 7.

Referring now to FIGURE 1 of the drawings, an approach to the bowling alley is shown at 20. Granite slabs 22 and 24 are placed on a concrete foundation indicated generally at 28. The slabs 22 and 24 are aligned and in substantially abutting relationship so as to form a joint 26. The juncture between the bowling alley approach 20 and the first slab 22 is indicated at 30. A pit 32 is shown at the far end of the alley remote from the approach 20.

FIGURES 2 through 6 disclose some of the details of the concrete foundation 28 and the manner in which it supports the granite slabs 22, 24 and the approach 20. Wall-like legs 40 are adapted to extend downwardly into the earth. A footing or flanged portion 34 is disposed at the base of each leg 40 which legs extend about the entire periphery of the alley so as to completely encircle the foundation. A shoulder 36, shown in FIGURE 3, engages three sides of the approach end 20. Referring to FIGURE 4 there is seen a shoulder 42 which engages the sides of the slabs 22 and 24 and is somewhat lower than the shoulder 36 at the approach end 20. Referring to FIGURE 5, the foundation 28 is cut away at 44 to provide for the pit 32. As is best seen in FIGURES 3–5, a grout or other suitable mortar 38 is placed between the concrete foundation 28 and the granite slab 22, 24 and the approach 20.

It will be apparent that FIGURES 1–6 show a bowling alley without gutters, ball return, pin spotters and other standard equipment and it is to be expressly understood that such standard accessories form no part of the present invention. These accessories may be purchased from a bowling equipment manufacturer, such as the Brunswick Balke Collender Company.

Figure 7:
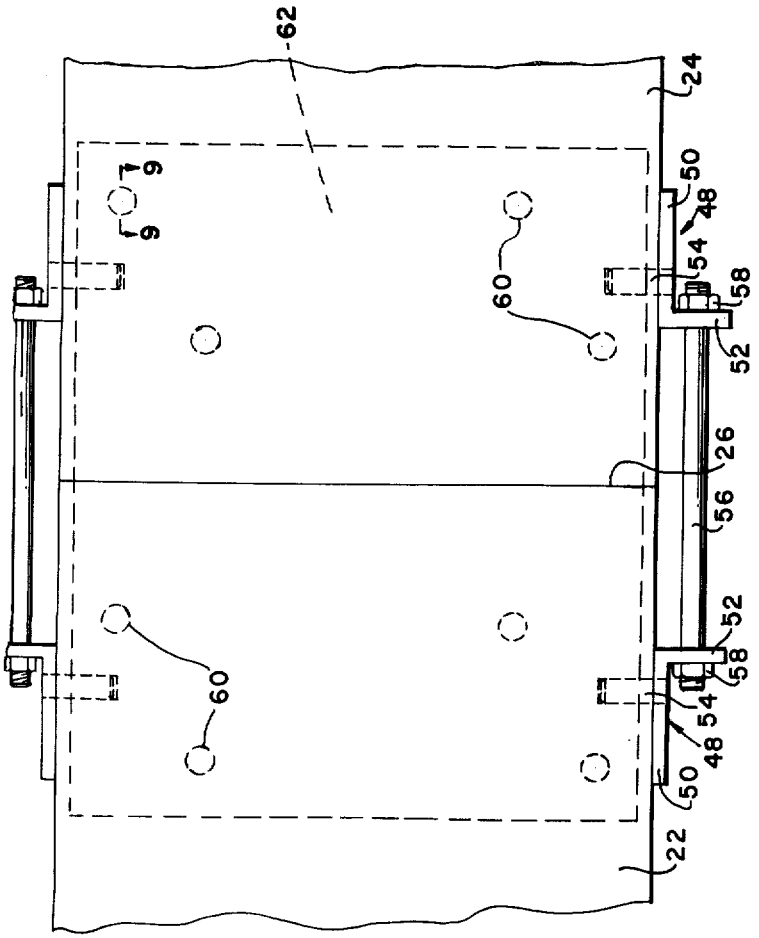
FIGURE 7 is a fragmentary plan view showing the manner in which the central joint is established.
Figure 8:
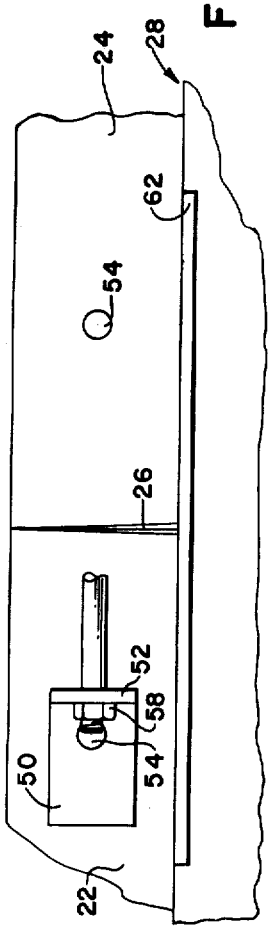
FIGURE 8 is a side elevation of FIGURE 7.

Reference is now made to FIGURES 7–9 which show the manner of establishing a preferred type of joint between the slabs 22 and 24. A pair of angle plates designated generally at 48 is placed on each side of the slabs 22, 24 so as to straddle the joint 26. Each angle plate 48 is shown to comprise a leg 50 which contacts the sides of the granite slabs and a leg 52 which is at right angles to the sides of the granite slabs. A pin 54 is shown to extend through a bore in each leg 50 and into the adjacent granite slab. A threaded stud 56 passes through a bore in each of the legs 52 and each stud 56 is placed under tension by tightening a pair of nuts 58.

A rigid plate 62, preferably of steel, underlies the granite slabs 22 and 24 on a horizontally disposed portion of the foundation 28 in the region adjacent the joint 26.

A plurality of rigid pins 60, preferably of steel, extend from the concrete foundation 28 through individual bore holes in the rigid plate 62 and into the underside of granite slabs 22 and 24. As is seen in FIGURE 9, that part of the pin 60 which extends into the granite slab is encapsulated with a plastic sealing material 64 composed partially of metal so that, when hardened, it is substantially incapable of expansion and contraction so that the joint remains rigid.

The joint 26 is tapered from the top surface of the granite slabs 22 and 24 down to the rigid plate 62 so that the top surfaces of the granite slabs abut one another while there is a slight space at the meeting edges of the bottom surfaces of the slabs. A suitable calking material similar to that used in connection with pin 60 is placed in this space and tension in the threaded studs 56 provides a clamping action which is maintained until the calking material in the joint 26 and the plastic material surrounding the ends of each pin 60 has had an opportunity to harden. Thereafter, the clamping action is discontinued and the means used to provide the clamping action is disassembled and removed.

Figure 10:
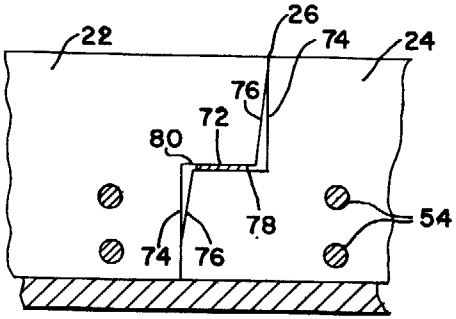
FIGURE 10 is a side elevation and cross-section of a modified form of the central joint.

A modified form of joint 26 is shown in FIGURE 10. In this embodiment a step is provided in each of the granite slabs. Vertically cut sections are shown at 74 in each of the slabs in an offset relationship. Tapered cut surfaces 76 are provided in each slab opposite the respective vertically cut sections 74 so that a pair of tapered joint spaces are formed as in the manner described in connection with the embodiment of the invention illustrated in FIGURES 1–9. In this manner a horizontal step portion 78 is provided on which is placed a shim 72 to compensate for minor changes in elevation.

Figure 11:
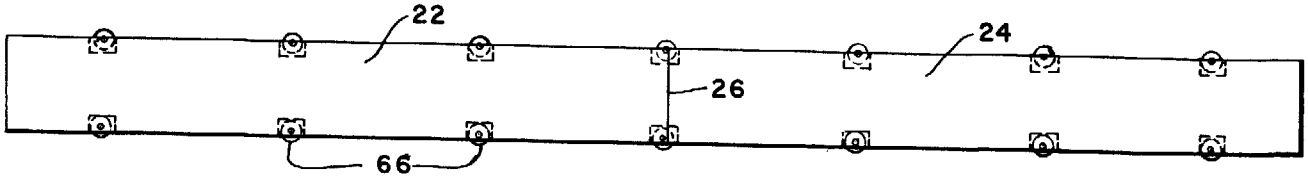
FIGURE 11 is a plan view showing the means for jacking the alleys.
Figure 12:
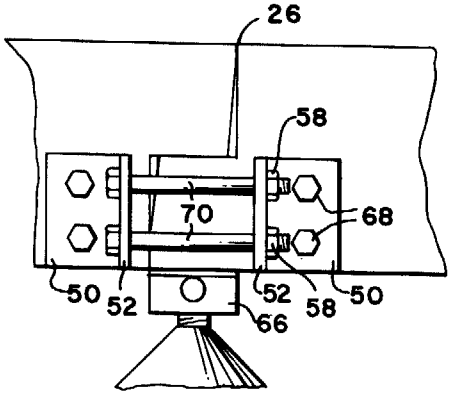
FIGURE 12 is a fragmentary side view showing the jacking means and the means for establishing the modified central joint of FIGURE 10.

FIGURES 11 and 12 show the means to establish and maintain the granite slabs 22 and 24 level. A plurality of jacks 66 are embedded in the foundation and are equally spaced beneath the marginal edge portions of the granite slabs 22 and 24.

A slightly modified clamping means is shown in FIGURE 12 for the modified form of joints described with respect to FIGURE 10. In this clamping means a pair of angle plates 48 are attached to the slabs by means of bolts 68 which extend across the granite slabs and are held by nuts on the other side, not shown. A plurality of bolts 70 pass through these angle plates and are placed under tension by nuts 58.

Figure 13:
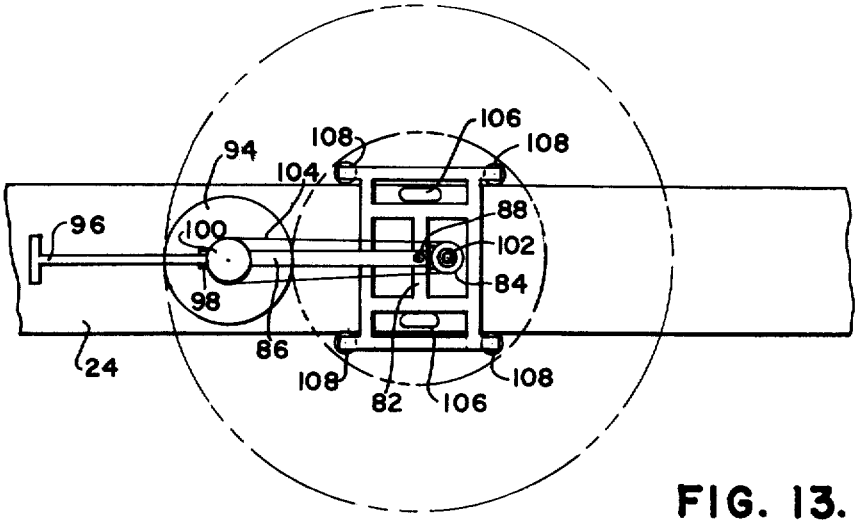
FIGURE 13 is a plan view of a buffer for the bowling alleys.
Figure 14:
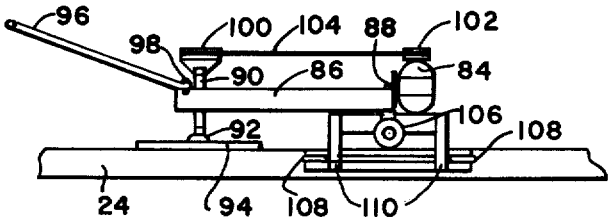
FIGURE 14 is a side elevation of the buffer of FIGURE 13.
Figure 15:
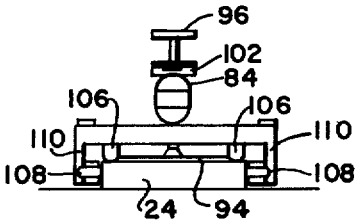
FIGURE 15 is an end view of the buffer of FIGURE 13.

Reference is now made to FIGURES 13–15 which disclose a novel buffer to be used in connection with the permanent installation of the outdoor bowling alley to provide a smooth surface on the granite slabs. The granite slabs are received at the permanent installation with a commercial saw cut finish so as to prevent any surface vitrification of the granite slabs which could produce small cracks in the granite slabs during the course of shipping. A smooth surface is provided for the granite slabs by a novel buffer which will now be described.

The buffer is provided with a frame generally indicated at 82 to which a motor 84 is mounted. This motor may be operated from any convenient source of electric power. A horizontal pivot member 86 has a vertical shaft 90 journaled therein opposite the frame member 82. Shaft 90 is provided with a universal joint 92 to which is attached a buffing disc 94 approximately three feet in diameter. A handle 96 is pivotally attached to the horizontal pivot member 86 at 98. A pulley 102 is mounted on the motor shaft and drives another pulley 100 by means of the belt 104. Any standard reduction pulley may be used for the pulley 100.

The buffer is provided with a pair of support wheels 106 adapted to engage the marginal portions of the upper side of slabs 22 and 24. The buffer is also supplied with two pairs of guide wheels 108 which are adapted to engage the sides of the granite slabs 22 and 24. The guide wheels 108 are suspended from the frame 82 by guide wheel support members 110. It is desirable to make the guide wheel support members 110 pivotal with respect to the frame 82, so that the guide wheels may be pivoted out of the way and locked for entrance to and exit from the bowling alley.

In the operation of the buffer an operator grasps the handle 96 and oscillates the buffing disc 94 which pivots with the horizontal pivot member 86 about the pivot pin 88. The buffing disc 94 is constructed of any standard granite buffing abrasive and is adapted to be used on the granite slabs 22 and 24 prior to the installation of the accessory bowling equipment.

The joint 30 between the approach end 20 and the first granite slab 22 is approximately one-half inch in width and is filled with pitch or other suitable flexible compound. This permits this end of slab 22 to expand. Slab 24 is completely unrestrained at its end remote from the joint 26. Therefore, any amount of expansion is possible for the granite slab 24.

It will be apparent that by providing an outdoor bowling alley constructed of abutting granite slabs, this invention avoids the warping and buckling problems inherent in outdoor bowling alleys constructed of wood. Also, the surface may be finished much smoother and maintained in this condition. Granite has a temperature coefficient of linear expansion of $3.6 \times 10^{-6}$ which is considerably lower than that of concrete and hence, much greater stability is provided. The cement surface also tends to have an abrasive effect on the plastic balls whereas the buffed granite surface eliminates this difficulty.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and the range of equivalency of the claims are therefore intended to be embraced therein.

What is claimed and desired to be secured by United States Letters Patent is:

[1. An outdoor bowling alley construction comprising a horizontally disposed support member, a pair of granite slabs placed on said horizontally disposed support member, said granite slabs positioned in substantially abutting relationship to form a joint, and means adjacent said joint for attaching said granite slabs to said horizontally disposed support member.]

[2. An outdoor bowling alley construction comprising a concrete foundation having a horizontally disposed support member, a pair of granite slabs placed on said horizontally disposed support member, said granite slabs positioned in substantially abutting relationship to form a joint, and a plurality of rigid pins extending through the underside of each of said granite slabs adjacent said joint and into said foundation to anchor said slab in the central portion of said horizontally disposed support member.]

[3. An outdoor bowling alley construction as claimed in claim 1 wherein said joint consists of a tapered portion beginning at the top surface of each of said granite slabs and extending to said horizontally disposed support member.]

[4. An outdoor bowling alley construction as claimed in claim 1 wherein said joint comprises a first tapered portion beginning at the top surface of said granite slabs and extending toward said horizontally disposed support member, a second tapered portion beginning at the bottom of said slabs and extending away from said horizontally disposed support member, and a substantially horizontal step portion between said tapered portions.]

[5. An outdoor bowling alley construction as claimed in claim 4 wherein said joint further comprises a shim placed on said substantially horizontal step portion to permit minor adjustments in elevation for said slabs.]

[6. An outdoor bowling alley comprising a concrete foundation having a horizontally disposed support member, a pair of granite slabs placed on said horizontally disposed support member, said granite slabs positioned in substantially abutting relationship to form a joint, means adjacent said joint for attaching said granite slabs to said horizontally disposed support member, and means to elevate and lower said granite slabs.]

[7. An outdoor bowling alley as described in claim 6 wherein said means to elevate and lower said slabs of granite includes a plurality of jacks embedded in said foundation beneath the marginal edges of said slabs of granite.]

[8. An outdoor bowling alley construction comprising a concrete foundation provided with a horizontally disposed support member, said foundation further comprising a plurality of wall-like legs extending downwardly into the earth and provided with a flanged portion completely encircling said foundation at the base of said legs, a pair of granite slabs on said horizontally disposed support member, said granite slabs positioned in substantially abutting relationship to form a joint, and means adjacent said joint for attaching said granite slabs to said horizontally disposed support member.]

[9. An outdoor bowling alley comprising a concrete foundation having a horizontally disposed support member, a pair of granite slabs placed on said horizontally disposed support member, said granite slabs positioned in substantially abutting relationship to form a joint, a rigid metal plate placed on said horizontally disposed support member beneath said granite slabs in the region of said joint, and a plurality of rigid pins extending through the underside of each of said granite slabs adjacent said joint and extending through said metal plate and into said foundation to anchor said slabs in the central portion of said horizontally disposed support member.]

[10. An outdoor bowling alley comprising a concrete foundation having a horizontally disposed support member, a first granite slab placed at one end of said horizontally disposed support member providing an approach for said alley, a second granite slab positioned on said horizontally disposed support member and spaced longitudinally from said first granite slab to allow for expansion, a third granite slab placed on said horizontally disposed support member and positioned in substantially abutting relationship with said second granite slab to form a joint, and means adjacent the joint between said second and third granite slabs for attaching said granite slabs to said horizontally disposed support member.]

*11. A bowling alley construction comprising a horizontally disposed support member, a pair of granite slabs placed on said support member in opposed surface contact relationship, said slabs being positioned in abutting end to end relationship to form a joint, and means embedded in the horizontal support member adjacent the joint and extending into each slab for attaching the slabs to the support member.*

*12. A bowling alley construction comprising a concrete foundation having a horizontally disposed support member, a pair of granite slabs placed on said horizontally disposed support member, said granite slabs positioned in substantially abutting relationship to form a joint, and a plurality of rigid pins extending through the underside of each of said granite slabs adjacent said joint and into said foundation to anchor said slab in the central portion of said horizontally disposed support member.*

*13. A bowling alley construction as claimed in claim 11 wherein said joint comprises a first tapered portion beginning at the top surface of said granite slabs and extending toward said horizontally disposed support member, a second tapered portion beginning at the bottom of said slabs and extending away from said horizontally disposed support member, and a substantially horizontal step portion between said tapered portions.*

*14. A bowling alley construction as claimed in claim 13 wherein said joint further comprises a shim placed on said substantially horizontal step portion to permit minor adjustments in elevation for said slabs.*

*15. A bowling alley comprising a concrete foundation having a horizontally disposed support member, a pair of granite slabs placed on said horizontally disposed support member, said granite slabs positioned in substantially abutting relationship to form a joint, means adjacent said joint for attaching said granite slabs to said horizontally disposed support member, and means to elevate and lower said granite slabs.*

*16. A bowling alley as described in claim 15 wherein said means to elevate and lower said slabs of granite includes a plurality of jacks embedded in said foundation beneath the marginal edges of said slabs of granite.*

*17. A bowling alley construction comprising a concrete foundation provided with a horizontally disposed support member, said foundation further comprising a plurality of wall-like legs extending downwardly into the earth and provided with a flanged portion completely encircling said foundation at the base of said legs, a pair of granite slabs on said horizontally disposed support member, said granite slabs positioned in substantially abutting relationship to form a joint, and means adjacent said joint for attaching said granite slabs to said horizontally disposed support member.*

*18. A bowling alley comprising a concrete foundation having a horizontally disposed support member, a pair of granite slabs placed on said horizontally disposed support member, said granite slabs positioned in substantially abutting relationship to form a joint, a rigid metal plate placed on said horizontally disposed support member beneath said granite slabs in the region of said joint, and a plurality of rigid pins extending through the underside of each of said granite slabs adjacent said joint and extending through said metal plate and into said foundation to anchor said slabs in the central portion of said horizontally disposed support member.*

*19. A bowling alley comprising a concrete foundation having a horizontally disposed support member, a first granite slab placed at one end of said horizontally disposed support member providing an approach for said alley, a second granite slab positioned on said horizontally disposed support member and spaced longitudinally from said first granite slab to allow for expansion, a third granite slab placed on said horizontally disposed support member and positioned in substantially abutting relationship with said second granite slab to form a joint, and means adjacent the joint between said second and third granite slabs for attaching said granite slabs to said horizontally disposed support member.*

References Cited in the file of this patent

UNITED STATES PATENTS

| | | |
|---|---|---|
| 1,976,563 | Johnsen et al. | Oct. 9, 1934 |
| 2,141,708 | Elmendorf | Dec. 27, 1938 |
| 2,301,778 | Gremp et al. | Nov. 10, 1942 |
| 2,475,046 | Pedersen | July 5, 1949 |
| 2,531,168 | Snyder | Nov. 21, 1950 |
| 2,603,919 | Robinson | July 22, 1952 |
| 3,014,722 | Green | Dec. 26, 1961 |

FOREIGN PATENTS

| | | |
|---|---|---|
| 473,391 | Germany | Mar. 14, 1929 |